United States Patent
Lu

(10) Patent No.: US 8,165,017 B2
(45) Date of Patent: Apr. 24, 2012

(54) GMPLS FAST RE-ROUTE FOR OADM AND AUX 10MBPS SUPPORT

(75) Inventor: Biao Lu, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 13/027,156

(22) Filed: Feb. 14, 2011

(65) Prior Publication Data

US 2011/0199892 A1  Aug. 18, 2011

Related U.S. Application Data

(62) Division of application No. 11/851,361, filed on Sep. 6, 2007, now Pat. No. 7,889,642.

(51) Int. Cl.
*G01R 31/08* (2006.01)
(52) U.S. Cl. ...................................... 370/228
(58) Field of Classification Search ........... 370/216–228
See application file for complete search history.

(56) References Cited

U.S. PATENT DOCUMENTS

| | | |
|---|---|---|
| 2002/0005968 A1 | 1/2002 | Suzuki |
| 2005/0111351 A1 | 5/2005 | Shen |
| 2007/0147434 A1 | 6/2007 | Toyoda |
| 2008/0155101 A1 | 6/2008 | Welsh et al. |

FOREIGN PATENT DOCUMENTS

| | | |
|---|---|---|
| EP | 0438022 A2 | 7/1991 |
| WO | WO 2006106973 A1 | 10/2006 |

OTHER PUBLICATIONS

Cisneros, Roan, 'International Search Report', Oct. 2008, European Patent Office, Rijswik.
Cisneros, Rolan, Written Opinion of the International Searching Authority (PCT Rule 43bis.1), Oct. 2008, European Patent Office, Munich.
Toyoda, Hidehiro et al., 'A 100-Gb-Ethernet Subsystem for Next Generation Metro-Area Network,' Communications, 2005. ICC 2005. 2005 IEEE International Conference, Seoul, Korea May 2005, pp. 1036-1042, vol. 2, 16, IEEE Piscataway, New Jersey, USA.

*Primary Examiner* — Kwang B Yao
*Assistant Examiner* — Tung Q Tran
(74) *Attorney, Agent, or Firm* — North Weber & Baugh LLP; W. Douglas Carothers; David L. Soltz

(57) ABSTRACT

Embodiments of the present invention provide a GMPLS fast re-route of packets within a network using a multicast address and a table comprising a list of alias IP addresses. According to various embodiments of the invention an alternate data path from a source node to a destination node allows a packet to traverse to the destination node without IP forwarding techniques being applied. In other words, a tunneling effect from a source node to a destination node allows other nodes in the network to ignore the packet and only read the multicast address within the header and immediately forward the packet to the destination node. A predetermined set of IP addresses are determined from network topology including all potential paths, for a packet to traverse, to a destination address.

6 Claims, 5 Drawing Sheets

GMPLS FAST RE-ROUTE FOR OADM AND AUX 10MBPS SUPPORT

This application is a divisional of application Ser. No. 11/851,361, filed Sep. 6, 2007, now U.S. Pat. No. 7,889,642 the contents of which are incorporated herein by reference.

BACKGROUND

A. Technical Field

This invention relates generally to multiprotocol label switching in optical communication networking systems, and more particularly, to a generalized multiprotocol label switching fast re-route around a network event.

B. Background of the Invention

The Internet's network layer has three major components, the IP Protocol, the routing component, and the facility. The IP protocol determines addressing conventions, datagram formats, and packet handling conventions. The routing component determines the path a datagram follows from a source to a destination. Examples of these protocols are Routing Information Protocol ("RIP"), Open Shortest Path First ("OSPF"), and Border Gateway Protocol ("BGP"). The facility reports errors in datagrams and respond to requests for certain network-layer information and is known as the Internet Control Message Protocol ("ICMP").

In a datagram network, each time an end system wants to send a packet, it stamps the packet with the address of the destination end system and then transmits the packet on the network. As a packet is transmitted from a source to a destination, it passes through a series of routers. Each of these routers use the packet's destination address to forward the packet onto the next appropriate network node. Specifically, each router has a forwarding table that maps destination addresses to link interfaces. When a packet arrives at the router, the router uses the packet's destination address to lookup the appropriate output link interface in the forwarding table. The router then forwards the packet to that output link interface.

A method used by routers to determine the appropriate path onto which data should be forwarded is a routing protocol. The routing protocol also specifies how routers report changes and share information with the other routers in the network that they can reach. A routing protocol allows the network to dynamically adjust to changing conditions, otherwise all routing decisions have to be predetermined and remain static.

An intra-autonomous system routing protocol is used to determine how routing is performed within an autonomous system (hereinafter, "AS"). Intra-AS routing protocols are also known as interior gateway protocols (hereinafter, "IGP"). Historically, two routing protocols have been used extensively for routing within an AS in the Internet: RIP and OSPF. A routing protocol closely related to OSPF is the Intermediate System to Intermediate System (hereinafter, "IS-IS") protocol.

Internet addressing and forwarding are important components of the Internet Protocol (hereinafter, "IP"). There are two versions of IP in use today, the deployed IP protocol version 4, which is usually referred to simply as IPv4 and IP version 6, which is usually referred to as IPv6.

OSPF is a routing protocol that determines the best path for routing IP traffic over a TCP/IP network based on distance between nodes and several quality parameters. For example, in FIG. 1a client signal has a source node A 110 and a destination node D 130. OSPF determines the best path for the packet is from node A 110 to node E 120 to node D 130. This path is considered the chosen or active path for the packet. The path is based on routing protocols, in which each node performs a look up function, within a forwarding table, when the packet arrives at the node to determine the shortest hop to the next node or final destination of the packet. With OSPF, a router constructs a complete topological map of the entire autonomous system.

For example, in FIG. 2 the chosen path is node A 110 to node E 120 to node D 130. A break 200 may occur between node E 120 and node D 130 thus the packet must be re-routed to reach its intended destination node D 130. When this happens, RIP modifies the local routing table and then propagates this information by sending advertisements to its neighboring routers. As in FIG. 2, node C 170 may receive the datagram and provide an alternate route 210 to node D 130 based on the next shortest path.

The aforementioned routing protocols mainly support a unicast (i.e., point-to-point) communication, in which a single source node sends a packet to a single destination node. In broadcast routing, the network layer provides a service of delivering a packet sent from a source node to all other nodes in the network; multicast routing enables a single source node to send a copy of a packet to a subset of the other network nodes.

In prior internet architecture, a multicast packet is addressed using address indirection. That is, a single identifier is used for the group of receivers, and a copy of the packet that is addressed to the group using this single identifier is delivered to all of the multicast receivers associated with that group. In the internet, the single identifier that represents a group of receivers is a class D multicast address. IP multicast packets are identified by using a range of multicast addresses. The addresses within this range are reserved for specific purposes. For example, 224.0.0.1 means all nodes on the subnet, while 224.0.0.2 means all routers on the subnet.

Multiprotocol Label Switching (hereinafter, "MPLS") is a standard from the IETF for including routing information in the packets of an IP network. MPLS is used to ensure that all packets in a particular flow take the same route over a backbone. MPLS router attaches labels (tags) containing forwarding information to outgoing IP packets. The routers within the core, known as label switch routers (hereinafter, "LSRs"), quickly examine the label and forward the packet per its directions without having to look up data in tables and compute the forwarding path each time.

Generalized Multiprotocol Label Switching (hereinafter, "GMPLS"), enhances MPLS architecture by the complete separation of the control and data planes of various networking layers. GMPLS enables a seamless interconnection and convergence of new and legacy networks by allowing end-to-end provisioning, control and traffic engineering (hereinafter, "TE") even when the start and the end nodes belong to heterogeneous networks.

GMPLS is based on the IP routing and addressing models. The common control plane promises to simplify network operation and management by automating end-to-end provisioning of connections, managing network resources, and providing the level of QoS that is expected in the new applications.

In summary, GMPLS extends MPLS functionality by establishing and provisioning paths for: TDM paths (SONET), FDM paths (Light Waves), and Space division multiplexed paths (Photonic Cross-Connect). Thus, in a WDM optical networking system, it is the ability to route a data transmission based on the wavelength of light that carries it. The routing device only analyzes wavelengths (light frequencies) to make its forwarding decisions rather than inspecting fields within each packet. GMPLS adds numerous enhancements to MPLS in order to support optical networks.

As mentioned above GMPLS is critical to routing and forwarding in optical system networks. An extreme need for the fast routing and re-routing of packets around a network event, such as a failure, are essential as network speeds and complexities increase in today's optical networks.

SUMMARY OF THE INVENTION

Embodiments of the present invention provide a GMPLS fast re-route of a control message within a network using a IP multicast address and a table comprising a list of all possible multicast IP addresses for sending signaling packets. According to various embodiments of the invention an alternate data path from a source node to a destination node allows a packet to traverse to the destination node without IP forwarding techniques being applied.

In various embodiments of the invention, a tunneling effect from a source node to a destination node allows other nodes in the network to ignore the packet and only read the IP multicast address within the header and immediately forward the packet to the destination node. A predetermined set of IP addresses are determined from network topology including all potential paths, for a packet to traverse, to a destination address.

In other embodiments of the invention, a resource reservation protocol (hereinafter, "RSVP") message is encapsulated within an IP multicast packet and transported along the data plane. The RSVP message follows the data path and can be transported via a digital transport chassis or optical transport chassis. The RSVP is delivered to a destination node via the IP multicast packet using a predetermined alias IP multicast address.

Certain features and advantages of the invention have been generally described in this summary section; however, additional features, advantages, and embodiments are presented herein or will be apparent in view of the drawings, specification, and claims hereof. Accordingly, it should be understood that the scope of the invention is not limited by the particular characterizations presented in this summary section.

BRIEF DESCRIPTION OF THE DRAWINGS

Reference will be made to embodiments of the present invention, examples of which are shown in the accompanying figures. Those figures are intended to be illustrative, however, rather than limiting. Although the present invention is generally described in the context of the embodiments shown in the accompanying figures, the scope of the present invention is not restricted to the details of those particular embodiments.

DETAILED DESCRIPTION OF THE PREFERRED EMBODIMENTS

Embodiments of the present invention provide a GMPLS fast re-route of a control message within a network using a multicast address and a table comprising a list of alias IP addresses. According to various embodiments of the invention an alternate data path from a source node to a destination node allows a packet to traverse to the destination node without IP forwarding techniques being applied. In other words, a tunneling effect from a source node to a destination node allows other nodes in the network to ignore the packet and only read the multicast address within the header and immediately forward the packet to the destination node. A predetermined set of IP addresses are determined from network topology including all potential paths, for a packet to traverse, to a destination address.

In the following description, for the purpose of explanation, specific details are set forth in order, by the use of concrete examples, to provide a sound understanding of the present invention. It will be apparent; however, that the present invention may be practiced without some or even all of those details, and it will be recognized that embodiments of the present invention, some of which are described below, may be incorporated into a number of different devices, systems, and methods. Structures, devices, and methods depicted in block diagram are merely illustrative of exemplary embodiments of the present invention and are included in that form in order to avoid obscuring essential teachings of the present invention.

Furthermore, connections between components in the figures are not restricted to connections that are effected directly. Instead, connections illustrated in the figures between components may be modified or otherwise changed through the addition thereto of intermediary components, without departing from the teachings of the present invention.

Reference in the specification to "one embodiment" or "an embodiment" indicate that a particular feature, structure, characteristic, function, or method step described in connection with that embodiment is included in at least one embodiment of the present invention. The various uses of the phrase "in one embodiment" at different locations throughout the specification do not necessarily constitute multiple references to a single embodiment of the present invention.

Figure 1:
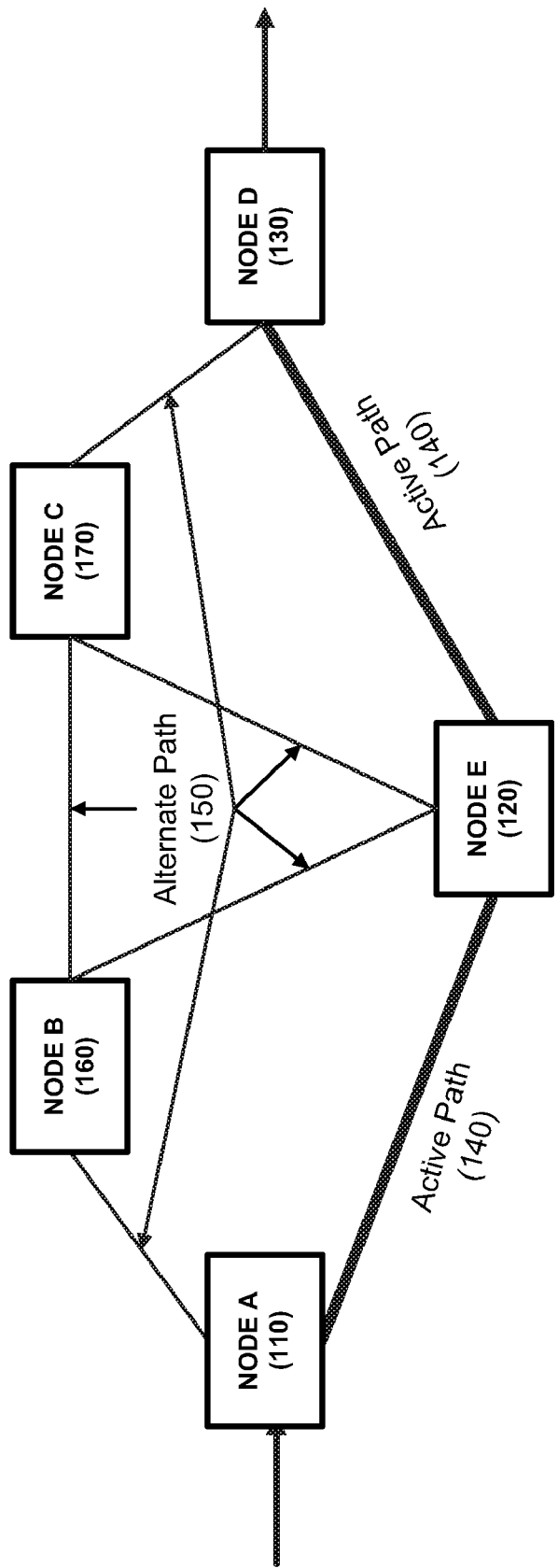
FIG. 1 is a schematic illustration, according to prior art, of a network of nodes according to various embodiments of the invention.
Figure 2:
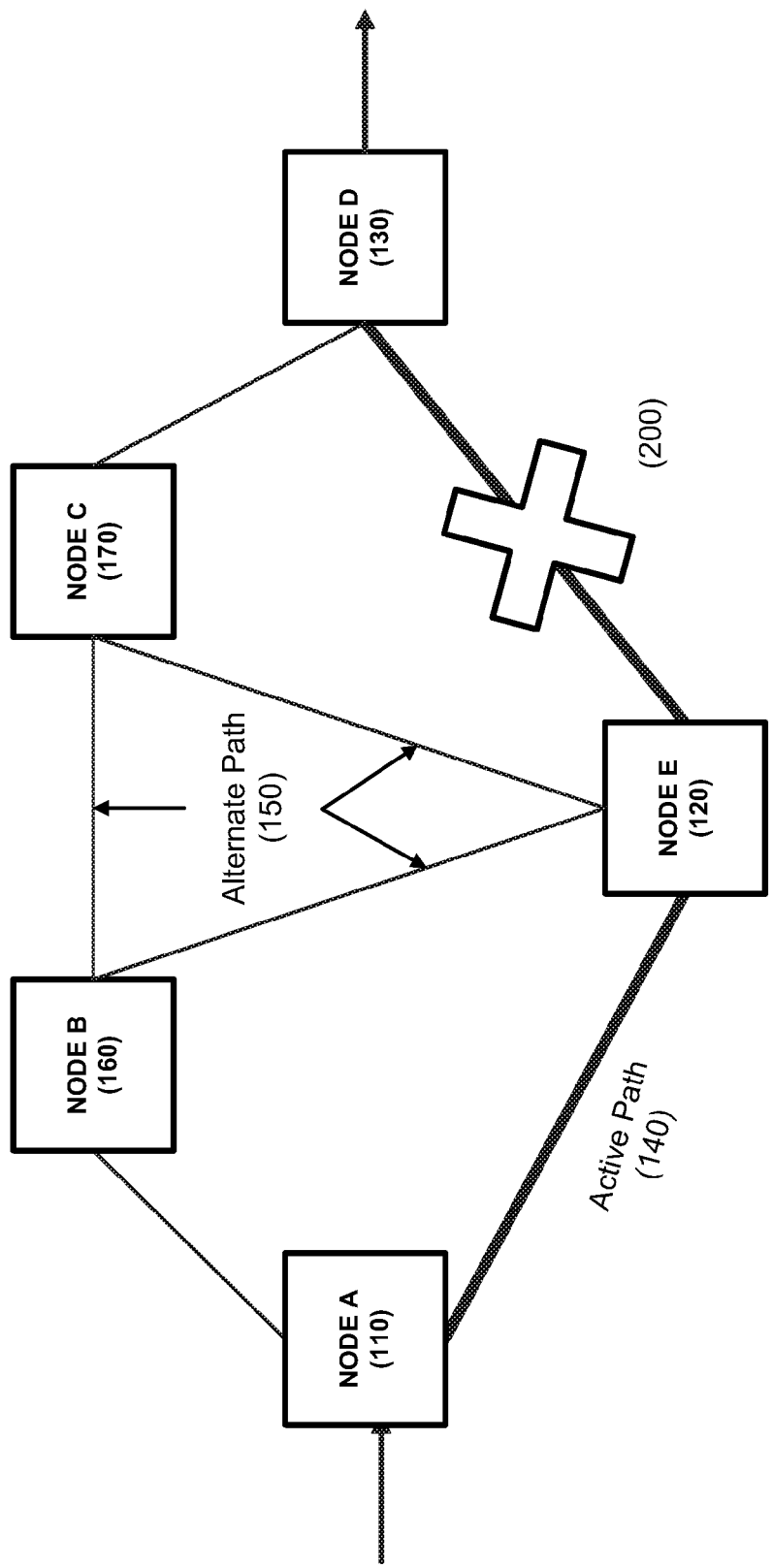
FIG. 2 illustrates, according to prior art, a network and associated paths used in IP forwarding of a packet when re-routing occurs according to various embodiments of the invention.
Figure 3:
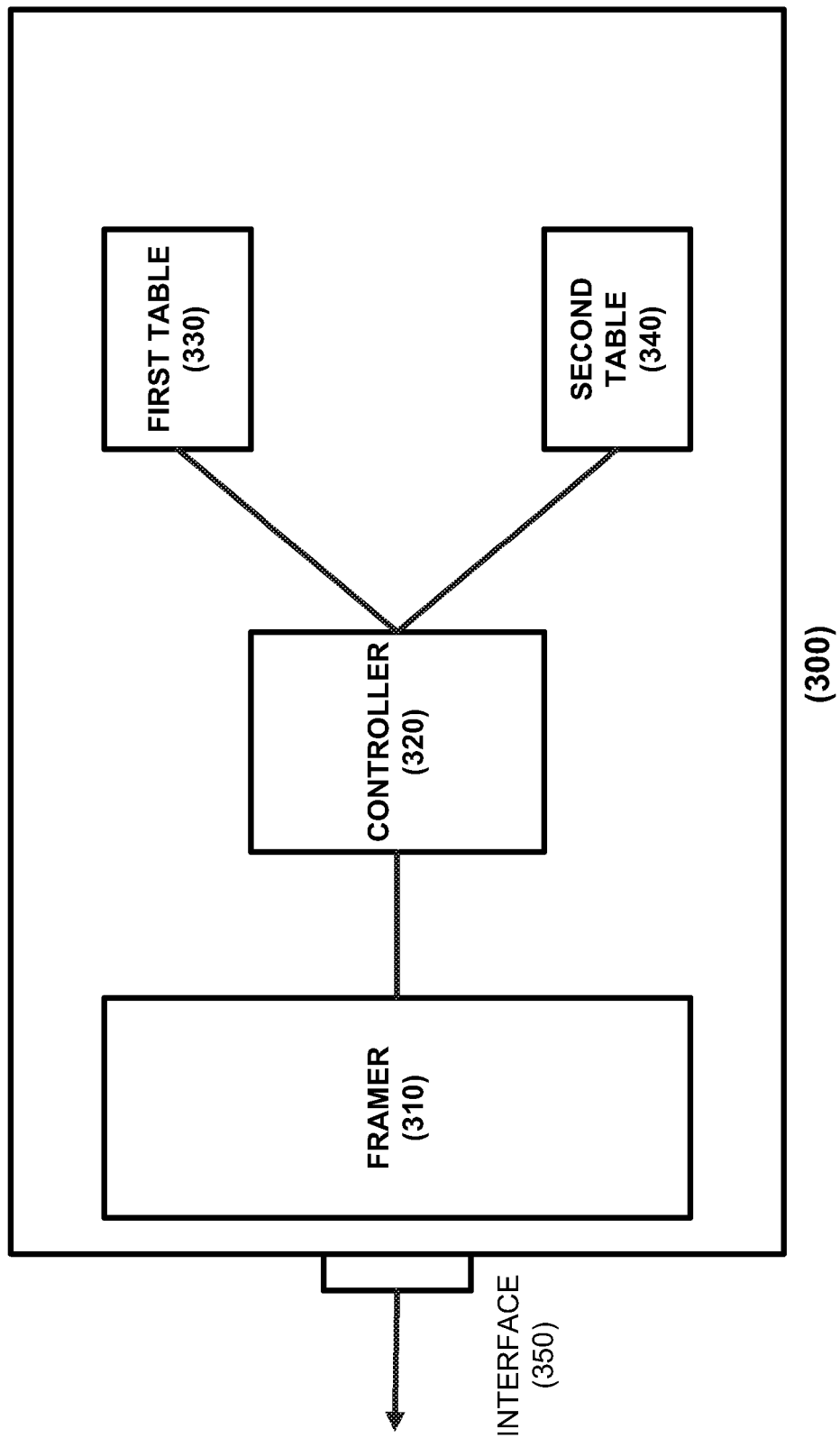
FIG. 3 is a general illustration of a node according to various embodiments of the invention.

FIG. 3 is an illustration of a node 300 comprising a header extraction module 310, a controller 320, a first table 330, and a second table 340 according to various embodiments of the invention. An optical interface 350 receives a packet at node 300. The header extraction module 310 extracts the destination address of the packet and propagates, within the node, the packet into a controller 320. The controller 320 analyses the destination IP address relative to the first table 330 and the second table 340 to determine what path the packet will travel on.

The first table 330 may be a system level table that stores at least one alias address for fast re-routing by implementing a multicast class address. In certain embodiments of the invention, a class of multicast addresses may be used. For example, but not limited to, a class of addresses may range from 224.0.0.0 to 224.0.0.255. The number of alias addresses stored may be equivalent to the total number of potential data paths the packet may traverse.

The second table 340 may be a local table that performs traditional IP forwarding by looking up the appropriate link to forward packet onto. IP lookup functions require a lookup of all possible paths and determine which path to send the data along. The second table 340 routing protocols may include RIP, OSPF, or IS-IS. Alternatively, in another embodiment, the first 330 and second 340 tables may be integrated into one table to perform both functions.

The system table allows a fast restoration of a signal from node A 110 to node D 130 if the original route is broken because the alias address will be known and the multicast forwarding table will be accessed. Once the alias address is determined all other nodes within the network recognize the destination address and forward the packet along the data path to the appropriate destination.

Figure 4:
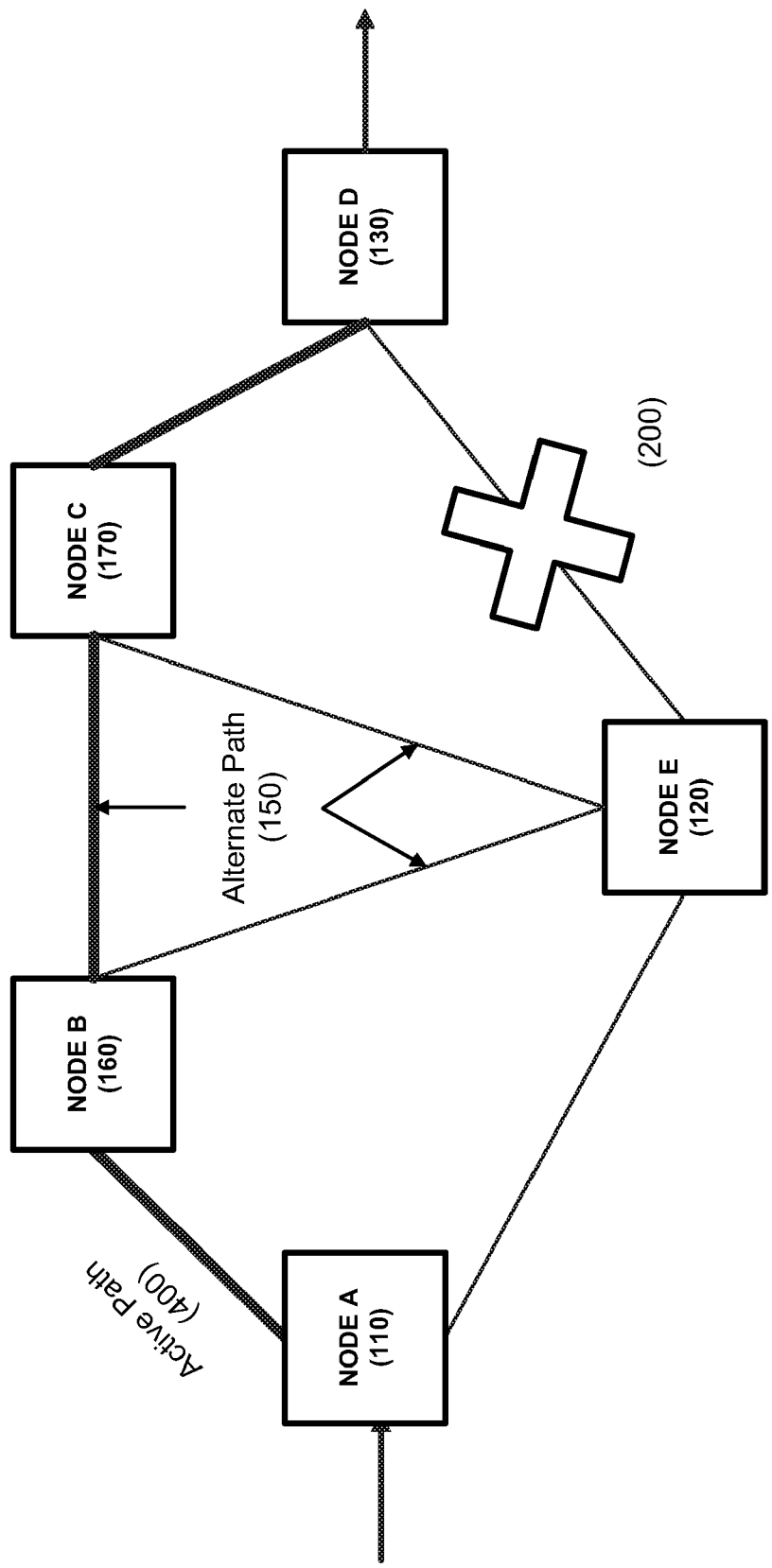
FIG. 4 is a general diagram of a network and associated paths a datagram may propagate when GMPLS fast re-routing occurs according to various embodiments of the invention.

FIG. 4 is an illustration of a network of nodes operably connected by a plurality of data paths. Source node A 110 is coupled to node E 120 and node B 160 via data paths (i.e. fiber or Optical Carrier Group "OCG"). Node B 160 is coupled to nodes A 110, C 170, and E 120 via data paths. Node C 170 is coupled to node B 160, E 120 and D 130 via data paths. Node D 130 is coupled to node C 170 and node E 120 via data paths. Node E 120 is coupled to nodes A 110, B 160, C 170, and D 130 via data paths. Each node has an incoming and outgoing optical interface 350 to receive and transmit packets.

In FIG. 4, a client packet may enter source node A 110 whereby the destination address is determined. In IP forwarding techniques the packet is forwarded along after the node performs a lookup to compute the shortest path to the destination node. In FIG. 4, the path from node A 110 to node E 120 to node D 130 is the shortest path, but the hop 200 between node E 120 and node D 130 is broken and thus another path to node D 130 is needed.

Node A 110 can determine, through monitoring the network, the hop 200 between node E 120 and node D 130 is broken, and use the IP multicast address to continue the packet along to D 130 via an alternative path 400. This alternative path 400 functions as a tunnel and protects the packet from being interfered with as the packet propagates along the data path. In other words, each node the packet encounters reads only the alias IP multicasts address and immediately forwards the packet and not perform traditional IP forwarding. GMPLS allows the data to traverse along the data plane and not the control plane, thus current IP forwarding is not interrupted when fast re-routing occurs. This decreases the delay in re-establishing data paths and enables a GMPLS fast re-route within an optical add drop multiplexer.

In another embodiment, a Resource Reservation Protocol (hereinafter, "RSVP") may be encapsulated into the IP multicast packet and received at a destination node with GMPLS fast re-routing of packet. Standard User Datagram Protocol (hereinafter, "UDP") is used to encapsulate the RSVP message into the IP multicast packet. UDP protocol ports distinguish multiple applications running on a single device from one another and are an interface between IP and upper-layer applications.

While the invention has been described in conjunction with several specific embodiments, it is evident to those skilled in the art that many further alternatives, modification, and variations will be apparent in light of the foregoing description.

Figure 5:
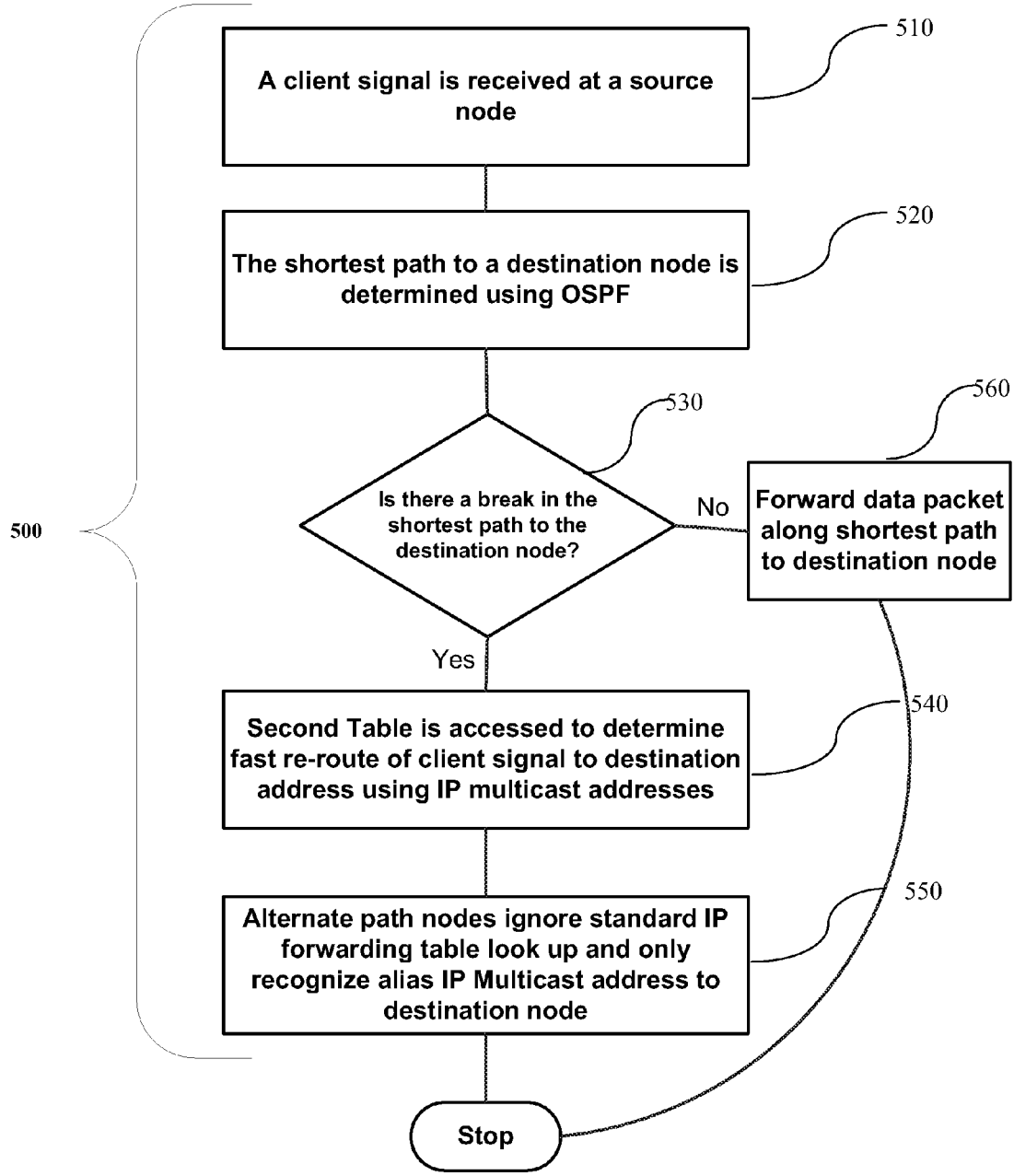
FIG. 5 is a flow chart illustration of a method to re-route a signal within an optical network according to various embodiments of the invention.

FIG. 5 is a flow chart illustrating a method, independent of structure, for transporting a client signal from a source node to a destination node via an alternative route when the initial path is broken. In accordance with this method 500, a client signal is received at a source node, whereby the signal is encapsulated with an alias IP multicast address. In certain embodiments of the invention this IP multicast address is within a range of multicast addresses.

The shortest path 520 from the source node to the destination node is determined using OSPF, whereby the packet is transported via the shortest path 560 to the destination node, unless the shortest path is broken 530. The faulty path may be determined by a monitor whereby the shortest path fails or the transmitting node has not received confirmation from the receiving node in a specified amount of time. When the shortest path is broken a second table containing a plurality of alias IP multicast addresses will be accessed 540 and a new alternate route from the source node to the destination node 550 will be determined by only looking at the IP multicast address, whereby a fast re-route of the original packet is performed.

The packet is detected on the data plane in which a monitor, or any other type of monitoring device, keeps track of the packets transmission across the data plane. The transmitter node, or head-end node, monitors the pass and failures of the data packet. If the data has a failure the packet is thus re-routed using the aforementioned techniques.

The foregoing description of the invention has been described for purposes of clarity and understanding. It is not intended to limit the invention to the precise form disclosed. Various embodiments may be possible with the scope and equivalence of the appended claims.

I claim:

1. A system that provides re-routing of a signal across a network, the network including a plurality of links, the system comprising:

a plurality of network nodes, coupled within a network, a first one of the plurality of network nodes being a destination node, a second one of the plurality of network nodes including:
an input interface coupled to receive the signal from the network;
a framer, coupled to the interface, that extracts an alias destination address from the signal, the alias destination address including a first internet protocol (IP) multicast address;
a plurality of output interfaces, a first one of the plurality of output interfaces being associated with an active path in the network and a second one of the plurality of output interfaces being associated with an alternative path in the network; and
a controller, the apparatus storing a plurality of second IP multicast addresses and data identifying the plurality of links in the network,
wherein, in the absence of a fault in the network, the controller is configured to identify the first one of the plurality of interfaces based on the data identifying the plurality of links in the network, such that the signal is directed toward a destination node in the network via the active path, and when the fault occurs in the network, the controller is configured to identify the second one of the plurality of interfaces based on the first IP multicast address and at least one of the plurality of second IP multicast addresses, such that the signal is directed toward the destination node in the network via the alternative path.

2. The system of claim 1, wherein the alternative path is a first alternative path, the system further comprising a second alternative path.

3. The system of claim 1 wherein the second one of the plurality of network nodes includes a first table and a second table, the plurality of second multicast IP addresses are stored in the first table and the data identifying the plurality of links in the network is stored in the second table.

4. The system of claim 1 wherein the second one of the plurality of networks includes a table, the plurality of second multicast IP addresses is stored in the table and the data identifying the plurality of links in the network is stored in the table.

5. The system of claim 1 wherein a resource reservation protocol message, encapsulated within the first IP multicast address by a user datagram protocol, is transported from a source node in the network to the destination node.

6. The system of claim 1 wherein each of the plurality of second IP multicast addresses corresponds to respective one of a plurality of routes in the network and defines a tunnel between a source node in the network and the destination node.

* * * * *